United States Patent [19]

Metzler et al.

[11] Patent Number: 5,107,966
[45] Date of Patent: Apr. 28, 1992

[54] BRAKE DISK FOR DISK BRAKES

[75] Inventors: Horst Metzler; Günther Schwarz, both of Tuttlingen, Fed. Rep. of Germany

[73] Assignee: Schwäbische Hüttenwerke GmbH, Aalen-Wasseralfingen, Fed. Rep. of Germany

[21] Appl. No.: 376,543

[22] Filed: Jul. 7, 1989

[30] Foreign Application Priority Data

Jul. 8, 1988 [DE] Fed. Rep. of Germany ....... 3823148

[51] Int. Cl.⁵ .............................................. F16D 69/02
[52] U.S. Cl. .......................... 188/251 M; 188/218 XL; 188/264 AA; 192/107 M
[58] Field of Search ....... 188/251 M, 218 R, 218 KL, 188/18 A, 264 A, 264 AA; 192/107 M

[56] References Cited

U.S. PATENT DOCUMENTS

| 3,306,401 | 2/1967 | Dosse | 188/251 M |
| 3,559,775 | 2/1971 | Miller | 188/218 XL X |
| 4,503,944 | 3/1985 | Burckhardt et al. | 188/218 XL X |
| 4,807,728 | 2/1989 | Suenaga et al. | 188/218 XL X |

FOREIGN PATENT DOCUMENTS

| 158902 | 9/1954 | Australia | 188/218 XL |
| 426529 | 5/1972 | Australia | 188/218 XL |
| 448101 | 4/1948 | Canada | 188/218 XL |
| 3320543 | 12/1984 | Fed. Rep. of Germany | 188/218 XL |
| 2557649 | 10/1985 | Fed. Rep. of Germany | |
| 149625 | 7/1986 | Japan | 188/218 XL |
| 521351 | 5/1940 | United Kingdom | 188/218 XL |

Primary Examiner—George E. A. Halvosa
Attorney, Agent, or Firm—Foley & Lardner

[57] ABSTRACT

A brake disk for motor vehicle disk brakes, comprising a disk rim with at least one friction ring, and an inner cup on which the disk rim is fastened. The disk rim and the inner cup consist of cast materials. In order that the inner cup and the disk rim can be produced more simply and correspond better to the different thermal and mechanical stresses, the inner cup preferably consists of a material of high tensil strength than the material of the disk rim. The disk rim is fastened to the cup by means of ribs provided on the inner cup, the material of the disk rim positively clasping the ribs in a radial direction during casting.

5 Claims, 3 Drawing Sheets

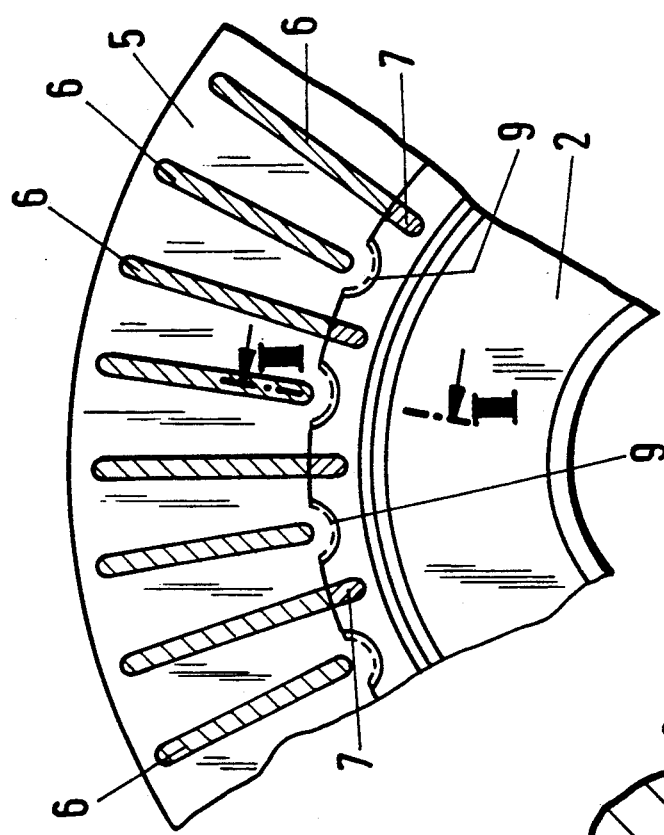
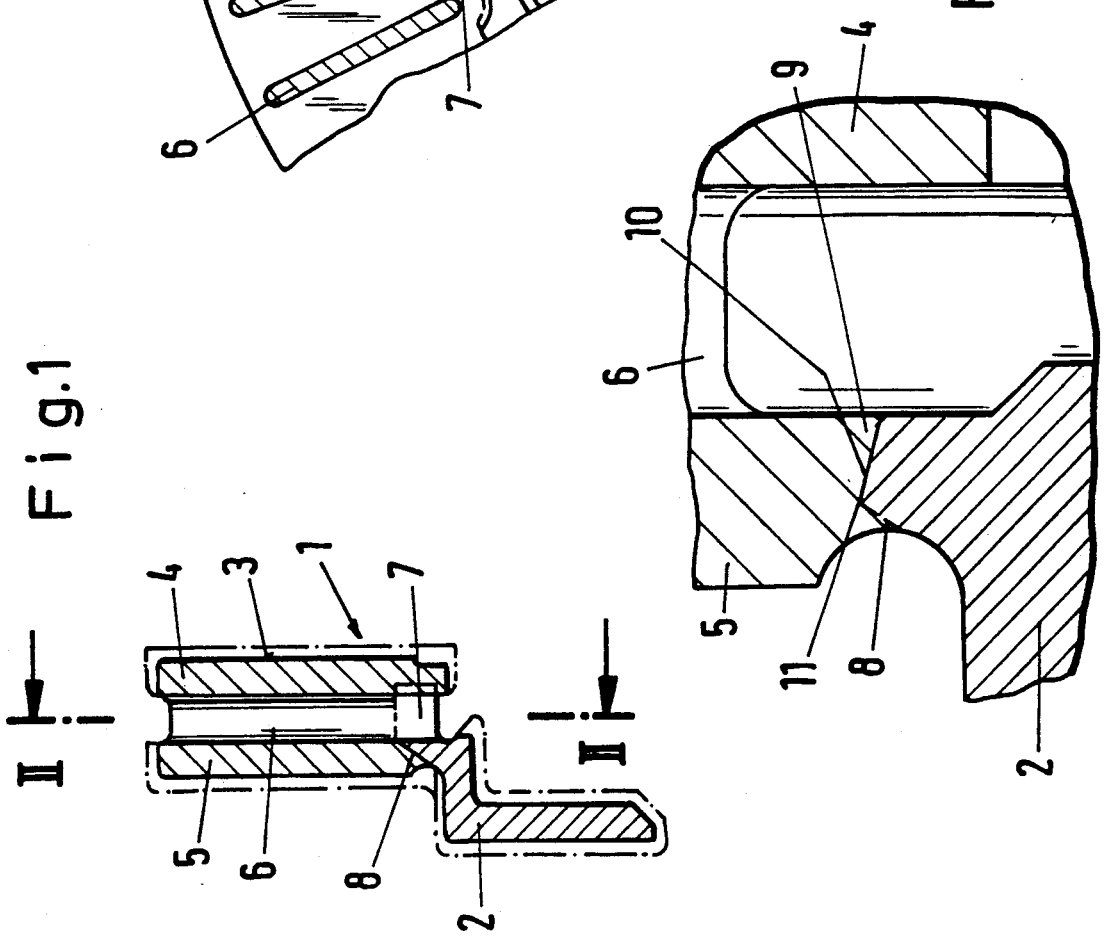

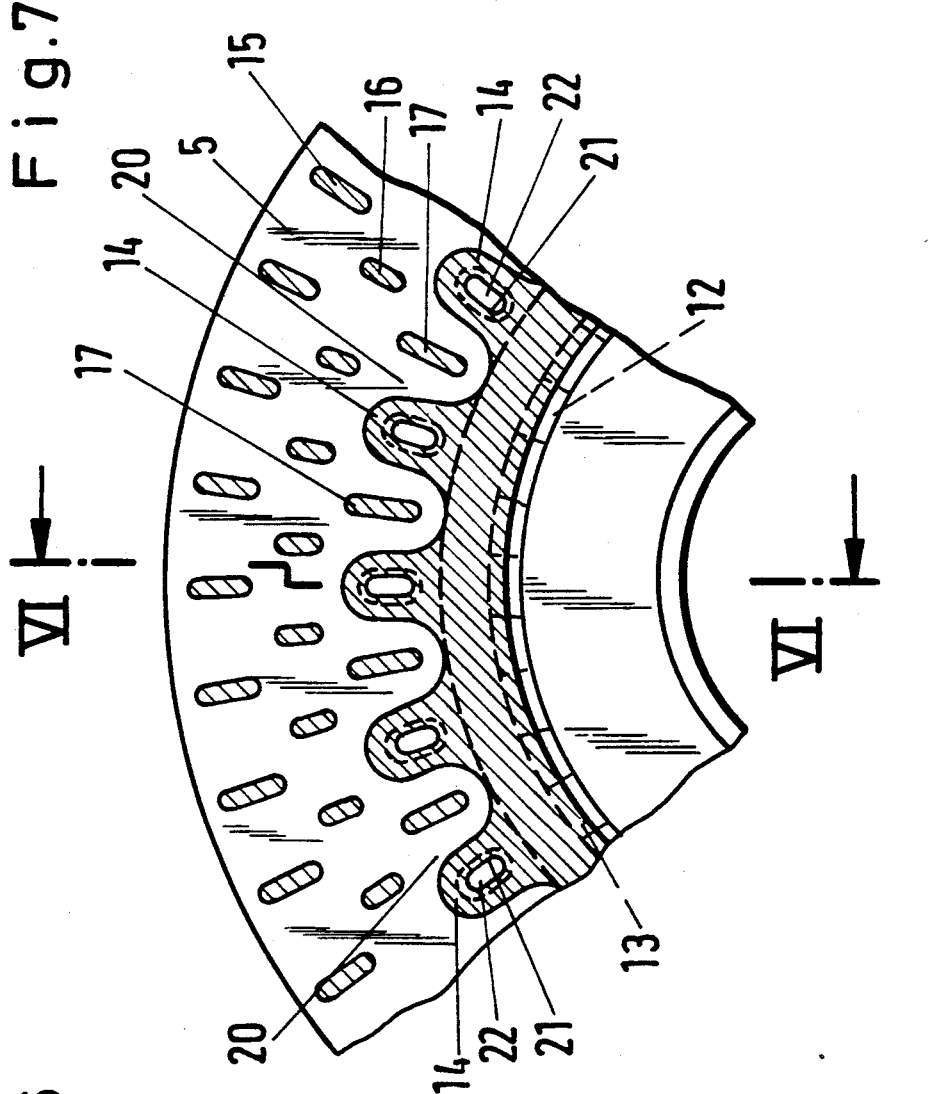
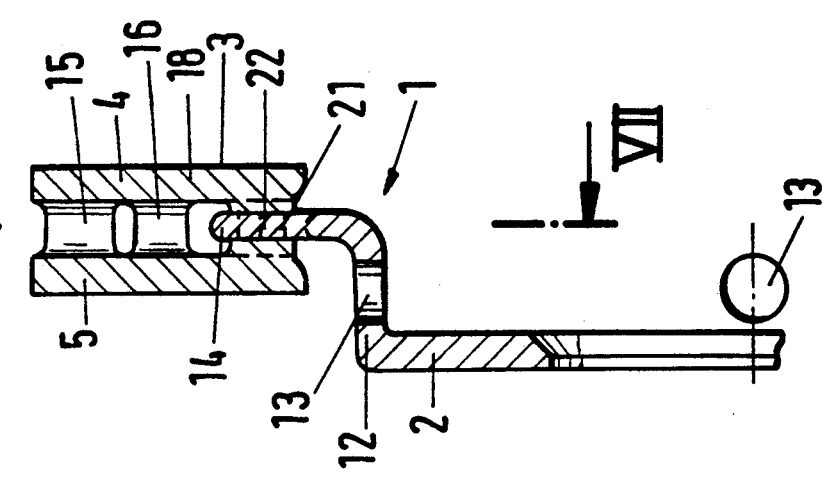

BRAKE DISK FOR DISK BRAKES

BACKGROUND OF THE INVENTION

The invention relates in general to a brake disk for disk brakes, and in particular to a brake disk for use on motor vehicles.

German Patent Specification 2,557,649 discloses an inner cup and friction disk produced as separate castings. The brake disk is carried on the inner cup by a plurality of ribs, which extend into corresponding depressions of the inner cup and on the radially outer lying ends of which the friction disk is positively fastened. In order that the ribs do not have to be inserted individually, it has already been proposed to connect the ribs to one another as a rib rim.

SUMMARY OF THE INVENTION

It is the object of the present invention to create a brake disk of the general type described but which better corresponds to the different stresses of the inner cup and the disk rim and which can be produced in a more simple way than previous disk assemblies.

The essential advantages of the invention reside in the inner cup, which itself should be dimensionally stable under the effect of high mechanical and thermal loading, consisting of a material of high tensile strength. In comparison, the disk rim is produced from a material of relatively lower tensile strength, since such cast materials of lower tensile strength have a relatively large content of free graphite, and as a result are thermally resistant to fire cracks and stresses. The relatively lower strength of the disk rim is compensated for by the high tensile strength of the inner cup, particularly where production is by compound casting. By compound casting, the brake disk can be produced in a simple way, since the inner part, cast from a high-strength material, is fitted on an inserted core for the casting of the disk. The mold is then filled with the material for the disk rim, which material flows laterally past the ribs and behind a radially inner lying edge of the ribs or into openings in the ribs. In this way, there occurs a positive connection of the ribs in a radial direction by the material of the disk rim.

Gray cast iron of a tensile strength of at least 250 N/mm$^2$ (GG25), or gray cast iron of a tensile strength of 300 N/mm$^2$ (GG30) have proved to be particularly suitable as material for the inner cup. For particularly high stresses, the inner cup may also consist of gray cast iron with spheroidal graphite of a tensile strength of at least 400 N/mm$^2$ (GGG40). For the disk rim, which in particular is subjected to a high thermal loading due to the interaction with the friction linings, the material preferably comprises a gray cast iron of high carbon content. Gray cast iron having a tensile strength of 100 to 150 N/mm$^2$ (GG10 or GG15) is preferred as the material for the disk rim. However, a sintered metal produced by a powder metallurgical process is also suitable for the inner cup.

According to the preferred embodiments of the invention, the brake disk comprises, in a manner known per se, two friction rings which are connected via a plurality of webs running in an axial direction. Such a disk rim permits the ribs of the inner cup to protrude into the space between the mutually opposite friction rings. A first embodiment of a disk rim fastened by compound casting on the ribs of the inner cup comprises one friction ring of the disk rim clasping the ribs, with the other friction ring being supported radially inwardly on the inner cup. In such a design, it is expedient to provide the friction ring, which is supported on the inner cup, with radially inwardly directed convexities, or projections, which lie between two neighboring ribs and engage in corresponding depressions on the inner cup. With this arrangement, large torques can be transferred.

In an alternative design, both friction rings clasp the ribs. The number of ribs which are located on the outer circumference of the inner cup and are anchored by compound casting in the disk rim may be determined by the requirements which are placed on the brake disk. A series of twenty ribs which are arranged evenly distributed around the circumference has proved to be favorable.

According to a further embodiment, the ribs are provided with circumferential openings parallel to the axis of rotation and into which the material flows during casting of the disk rim, so that anchoring webs are formed which extend through the ribs.

The brake disk according to the invention is explained in more detail below with reference to the drawings.

BRIEF DESCRIPTION OF THE DRAWINGS

FIG. 1 comprises a radial sectional view through a first embodiment of the brake disk according to the invention;

FIG. 2 is a sectional view taken along the line II—II in FIG. 1;

FIG. 3 is a sectional view taken along the line III—III in FIG. 2;

FIG. 6 shows an alternative embodiment of FIG. 4, and comprises a sectional view taken on line VI—VI of FIG. 7, and FIG. 7 is a sectional view taken along the line VII—VII in FIG. 6.

DETAILED DESCRIPTION OF THE PREFERRED EMBODIMENTS

Figure 5:
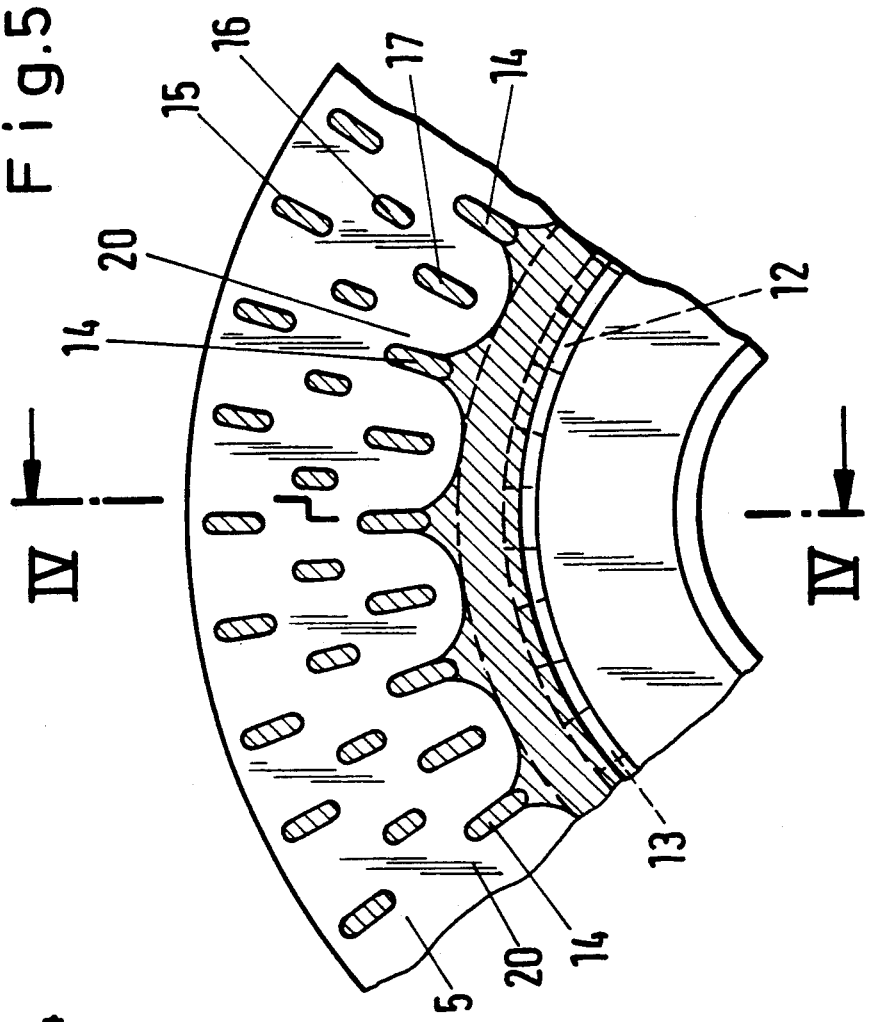
FIG. 5 is a sectional view taken along the line V—V in FIG. 4.

The brake disk 1 shown in FIGS. 1-3 consists of two parts, namely an inner cup 2 and a disk rim 3. The disk rim 3 comprises two friction rings 4 and 5, which are connected to each other by a plurality of webs 6 extending between them. On the outer circumference of the inner cup 2 there are formed ribs 7, which protrude into the radially inner lying region of the disk rim 3. The friction ring 4 rigidly clasps the ribs 7, so that the disk rim 3 is fixed on the ribs 7 in both radial directions. The friction ring 5 is supported by a sloping surface 8 which engages a correspondingly shaped surface of the inner cup 2.

The inner cup 2 is produced with the ribs 7 provided on its outer circumference as a casting or from sintered metal. In order to obtain the necessary strength if gray cast iron is used, iron with a tensile strength of at least 250 N/mm$^2$ is preferred. The inner cup 2 is placed into the casting mold for the disk rim 3, and the casting of the disk rim 3 is performed in the so-called compound casting process, whereby the ribs 7 of the inner cup 2 are cast between the friction rings 4 and 5 in the disk rim 3.

FIG. 2 comprises a sectional view taken along the line II—II in FIG. 1, and it will be seen that the ribs 7 of the inner cup 2 reach up to the lower edge of the webs 6. In this embodiment, a rib 7 is provided under every second web 6. In the region below the webs which are arranged between two ribs 7, the friction ring 5 has in each case a radially inwardly directed convex projection 9, which extends in each case into a corresponding depression formed in the inner cup 2 between two neighboring ribs 7. In this way, a positive connection in the direction of rotation of the brake disk 1 is achieved, whereby a very high torque transfer is ensured.

In the enlarged sectional view comprising FIG. 3, it will be seen that the inner cup 2 has on its outer circumference in the region between the ribs 7, in addition to the sloping surface 8, a further sloping surface 10, which is formed by the convex projection 9 and is arranged such that the point 11 furthest away from the axis of rotation is approximately in the center of the axial thickness of the friction ring 5.

Figure 4:
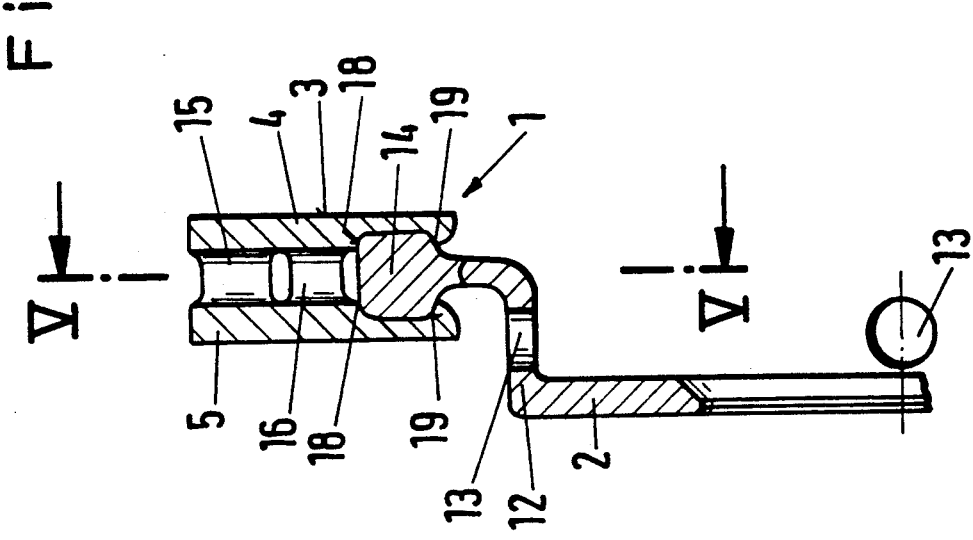
FIG. 4 comprises a radial sectional view taken on line IV—IV of FIG. 5, through a second embodiment of the brake disk according to the invention.

In the embodiment of FIG. 4, the inner cup 2 is provided in a lateral outer portion of the cylindrical section 12 with a plurality of bores 13, passing through the lateral portion of the cylindrical section in a radial direction. These bores 13 produce a good ventilation of the inner cup 2, whereby better heat dissipation is possible. On the outer circumference, the inner cup 2 has radially outwardly directed ribs 14, on which the disk rim 3 is fastened by means of compound casting. The disk rim 3 comprises two friction rings 4 and 5, which are connected to each other by a plurality of webs 15, 16, 17, arranged at different radial intervals with respect to the axis of rotation. The friction rings 4 and 5 rigidly clasp the ribs 14 in such a way that a positive connection is provided both on a radially outer lying surface 18 and on a radially inner lying surface 19. The production of the brake disk 1 according to FIG. 4 takes place in the same way as already described with respect to the embodiment of FIG. 1.

FIG. 5, a sectional view taken along the line V—V in FIG. 4, clearly shows the webs 15, 16, and 17 arranged at different radial intervals with respect to the axis of rotation. The cylindrical section 12 of the inner cup with the bores 13 (broken lines) can be seen radially within the friction ring 5. From the cylindrical section 12, the ribs 14 protrude radially outwardly into intermediate spaces 20 formed between two neighboring webs 17 in the radially inner region between the friction rings 4 and 5. By a corresponding shaping, the ribs 14 assume the function of the webs 17 lacking in the intermediate spaces 20.

The alternative embodiment of FIG. 6 is generally similar to the embodiment of FIG. 4, with similar reference numerals being employed where appropriate. What is different in FIG. 6, however, is the anchorage of the disk rim 3 on the inner cup 2. In FIG. 6, the ribs 14 have circumferentially spaced openings 21 which are parallel to the axis of rotation. In compound casting, the material of the disk rim 3 flows into these openings 21, whereby anchoring webs 22 are formed, which extend through the ribs 14.

FIG. 7, a sectional view taken along the line VII—VII in FIG. 6, is similar in many respects to FIG. 5, and the same reference numerals are used where appropriate. FIG. 7 clearly shows the form of the openings 21, which are shaped in this embodiment as slots. In the openings 21 are the anchoring webs 22.

What is claimed is:

1. A brake disk for motor vehicles disk brakes and the like, of the type having a disk rim of cast material provided with at least one friction ring and a separate inner cup likewise consisting of cast material and being formed with ribs directed toward said disk rim, wherein said inner cup consists of a gray cast iron of tensile strength of at least 250 N/mm$^2$ (GG25), and said disk rim consists of a material of high carbon content comprising gray cast iron of a tensile strength of 100–150 N/mm$^2$, and wherein the inner cup is preliminarily formed and the material of the disk rim positively anchors the ribs to said disk rim in a radial direction during casting of the disk rim around the ribs of the previously formed inner cup, said disk rim comprises two oppositely disposed friction rings which are connected by a plurality of circumferentially spaced webs running in an axial direction, said ribs of the inner cup protruding into openings between said friction rings, at least one of said friction rings of said disk rim clasping said ribs, and wherein the other friction ring is formed with radially inwardly directed convex projections between adjacent ribs, said inner cup being formed with corresponding depressions into which extend said projections so as to provide a high torque transfer.

2. The brake disk of claim 1, wherein said gray cast iron has a tensile strength of 300 N/mm$^2$ (GG30).

3. The brake disk as claimed in claim 1, wherein the inner cup consists of a gray cast iron with spheroidal graphite of a tensile strength of 400 N/mm$^2$ (GGG40).

4. The brake disk as claimed in claim 1, wherein the other of said friction rings is supported radially inwardly on the inner cup.

5. The brake disk as claimed in claim 1, wherein twenty ribs are distributed around the circumference of said inner cup, said ribs being incorporated in the material of the disk rim by compound casting.

* * * * *